United States Patent
Sakane

(10) Patent No.: US 11,242,930 B2
(45) Date of Patent: Feb. 8, 2022

(54) SEAL STRUCTURE AND SEAL METHOD

(71) Applicant: TOKYO ELECTRON LIMITED, Tokyo (JP)

(72) Inventor: Ryota Sakane, Miyagi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 257 days.

(21) Appl. No.: 16/353,479

(22) Filed: Mar. 14, 2019

(65) Prior Publication Data
US 2019/0285177 A1   Sep. 19, 2019

(30) Foreign Application Priority Data

Mar. 16, 2018 (JP) .............................. JP2018-049647

(51) Int. Cl.
*F16J 15/02*   (2006.01)

(52) U.S. Cl.
CPC ................................... *F16J 15/022* (2013.01)

(58) Field of Classification Search
CPC   F16J 15/022; F16J 15/02; F16J 15/021; F16J 15/32
See application file for complete search history.

(56) References Cited

U.S. PATENT DOCUMENTS

| | | | | |
|---|---|---|---|---|
| 1,618,188 A | * | 2/1927 | Groeniger | F16J 15/02 285/56 |
| 2,935,365 A | * | 5/1960 | Dega | F16J 15/32 277/468 |
| 3,246,793 A | * | 4/1966 | Wade | B65D 45/345 220/321 |
| 3,865,386 A | * | 2/1975 | Wilke | F16J 15/022 277/529 |
| 3,887,199 A | * | 6/1975 | Sundqvist | F16J 15/32 277/431 |
| 3,918,725 A | * | 11/1975 | Dryer | F16L 23/18 277/612 |
| 4,188,037 A | * | 2/1980 | Abbes | F16J 15/002 277/317 |
| 4,915,395 A | * | 4/1990 | Barteck | B29C 33/0044 249/95 |
| 5,071,318 A | * | 12/1991 | Bice | F16J 15/38 415/230 |

(Continued)

FOREIGN PATENT DOCUMENTS

| | | | | |
|---|---|---|---|---|
| JP | 04266664 A | * | 9/1992 | ............... F16F 3/12 |
| JP | 2005-235924 A | | 9/2005 | |

(Continued)

*Primary Examiner* — Eugene G Byrd
(74) *Attorney, Agent, or Firm* — Weihrouch IP

(57) ABSTRACT

A seal structure includes an elastic body and a cap which are located in a boundary between a first component and a second component that seal and define a gas flow path. The flow path is defined by a first through hole in the first component and a second through hole in the second component, the elastic body has a loop-shaped second opening which overlaps with a first opening of the first through hole, and the cap covers the elastic body such that the first opening, the second opening, and a third opening of the cap overlap with each other. The cap is fitted into a groove in the first surface and is in close contact with the second surface. The cap and second component are in close contact with each other to have slidability.

11 Claims, 12 Drawing Sheets

(56) References Cited

U.S. PATENT DOCUMENTS

| | | | | |
|---|---|---|---|---|
| 5,625,526 A | * | 4/1997 | Watanabe | G03F 7/707 |
| | | | | 361/234 |
| 2013/0267115 A1 | * | 10/2013 | Mark | G06F 1/20 |
| | | | | 439/485 |
| 2013/0313790 A1 | * | 11/2013 | Isayama | B65D 43/0222 |
| | | | | 277/637 |
| 2014/0138385 A1 | * | 5/2014 | Wolf | B60K 15/0406 |
| | | | | 220/378 |
| 2014/0138920 A1 | * | 5/2014 | Munroe | H01R 13/5205 |
| | | | | 277/606 |
| 2015/0292656 A1 | * | 10/2015 | Kishi | F16K 3/30 |
| | | | | 251/151 |
| 2016/0123471 A1 | * | 5/2016 | Roy | F16J 15/3284 |
| | | | | 277/336 |
| 2018/0224040 A1 | * | 8/2018 | Sanchez | F16J 15/0887 |

FOREIGN PATENT DOCUMENTS

| | | |
|---|---|---|
| JP | 2011-190902 A | 9/2011 |
| JP | 2013-170692 A | 9/2013 |

* cited by examiner

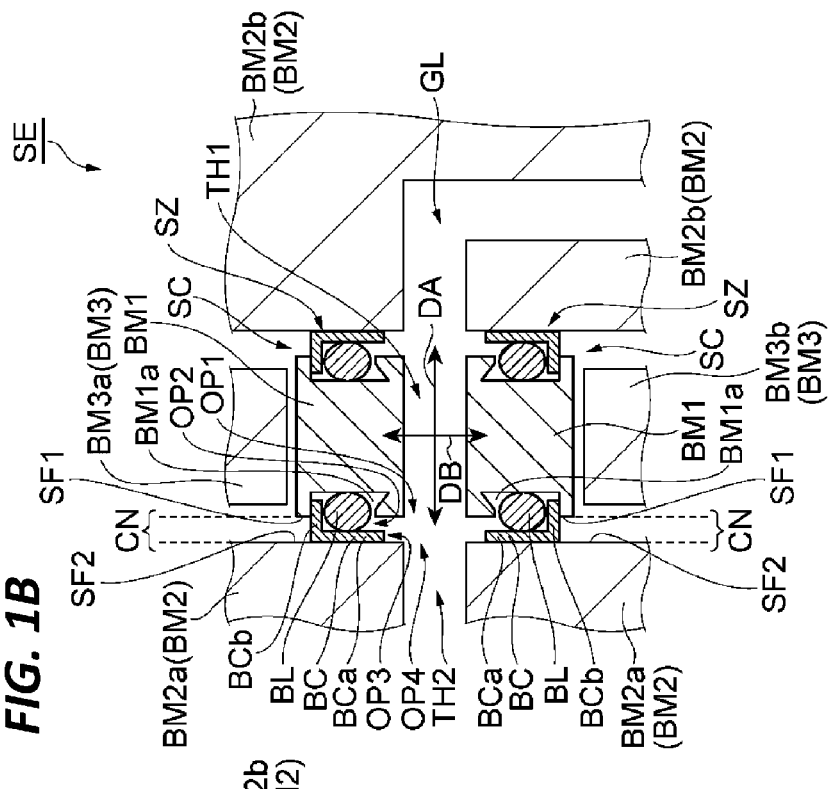
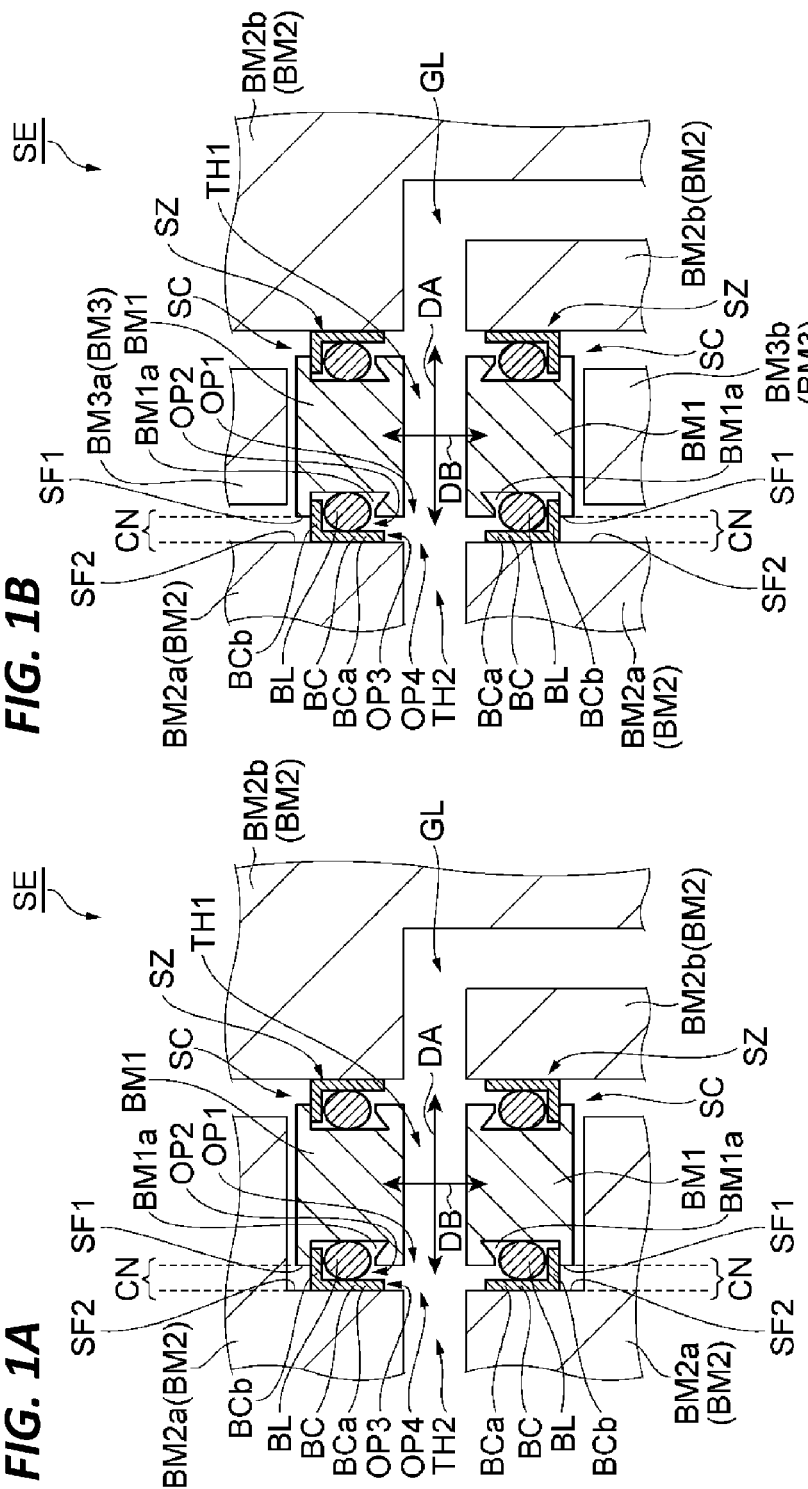

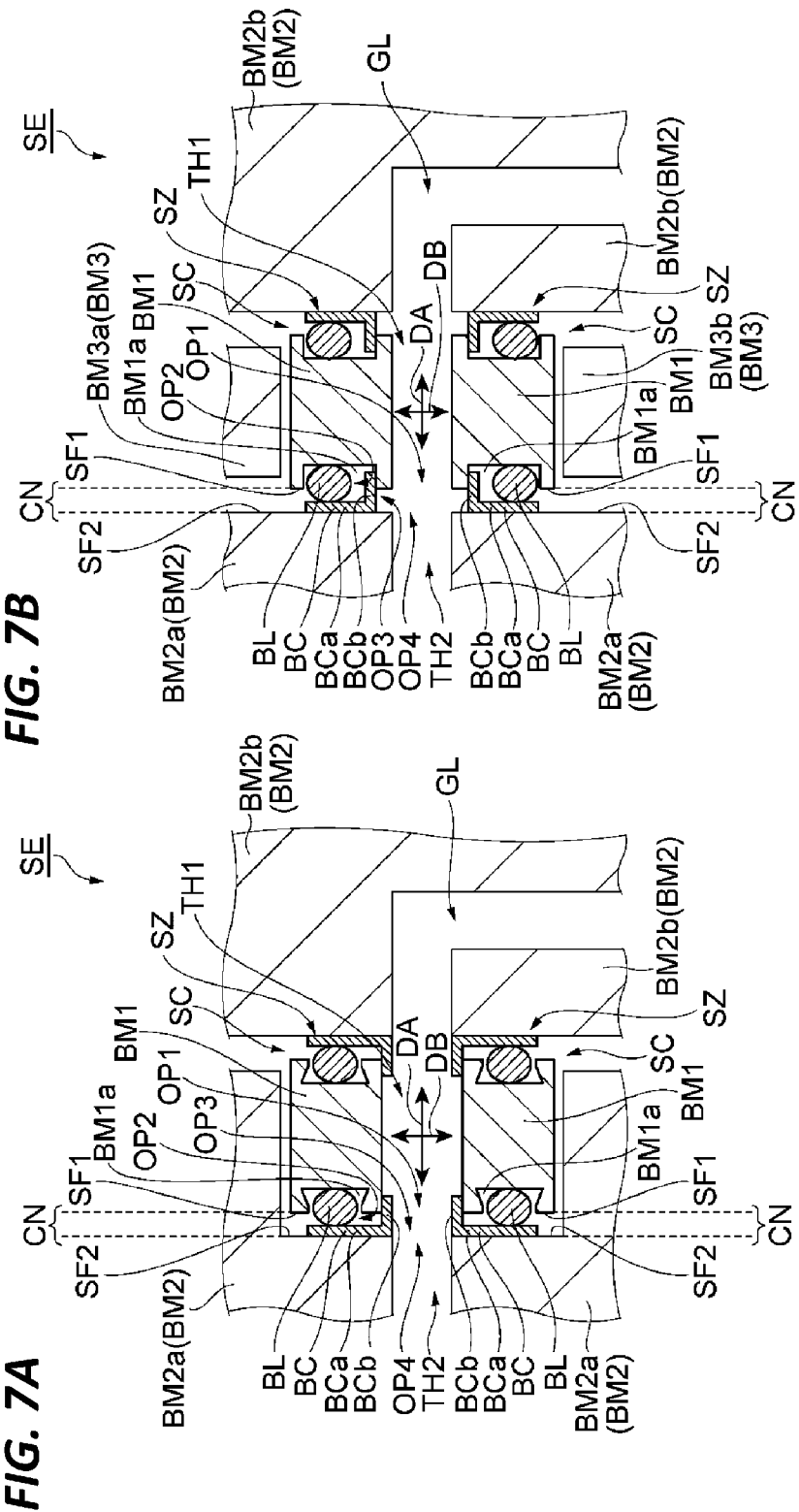

SEAL STRUCTURE AND SEAL METHOD

CROSS-REFERENCE TO RELATED APPLICATIONS

This application is based on and claims priority from Japanese Patent Application No. 2018-049647, filed on Mar. 16, 2018 with the Japan Patent Office, the disclosures of which are incorporated herein in their entireties by reference.

TECHNICAL FIELD

Embodiments of the present disclosure relate to a seal structure and a method for sealing a gas flow path.

BACKGROUND

In an apparatus in which a fluid such as, for example, a gas is used, the relative movement between the components may cause a leakage of the fluid. A seal structure for suppressing the leakage of the fluid in such an apparatus needs to have a suitable structure according to the movement of the components.

For example, Japanese Patent Laid-open Publication No. 2005-235924 discloses a technique that prevents a contact between a fluororesin sheet and an O-ring, and prevents a contact between the fluororesin sheet and a bolt, which causes burrs and deformation. Japanese Patent Laid-open Publication No. 2013-170692 discloses a technique relating to a thrust seal that reduces internal leakage of a rotary actuator. Japanese Patent Laid-open Publication No. 2011-190902 discloses a technique relating to a dry contact mechanical seal that prevents a gas leakage from a gap between the sealed end faces.

SUMMARY

In an aspect, a seal structure for sealing a gas flow path is provided. The seal structure includes a first component, a second component, and an elastic body and a cap, which are installed in a boundary between the first component and the second component. The first component includes a first through hole and a first surface. The second component includes a second through hole and a second surface. The first through hole extends from the first surface, and the second through hole extends from the second surface of the second surface. The boundary is defined by the first surface and the second surface. The flow path is defined by connecting the first through hole and the second through hole to each other. The first component and the second component may be arranged such that the first through hole and the second through hole are connected to each other. The elastic body has a loop shape and is installed in a groove in the first surface so as to protrude from the first surface. The elastic body is arranged such that a first opening of the first through hole overlaps with a second opening of the loop shape of the elastic body when viewed from above the first surface. The cap includes a third opening and is disposed on the elastic body to cover the elastic unit such that the third opening, the second opening, and the first opening overlap with each other when viewed from above the first surface. The cap is fitted into the groove in the first surface and being in close contact with the second surface. The cap and second component are in close contact with each other to have slidability.

In the above seal structure, since the cap is fitted into the groove in the first surface while covering the elastic body, friction and shearing caused by the sliding of the components occur in the cap. That is, since the cap covers the elastic body installed on the first component with respect to the second component, the elastic body does not come into direct contact with the second component facing the first component. Therefore, even when the first component and the second component slide relative to each other, the movement does not affect the elastic unit. In addition, since the cap is in close contact via the elastic body, the movement of the components toward and away from each other is absorbed by the expansion and contraction of the elastic unit, and thus the sealing of the gas flow path is maintained. That is, the first component and the elastic body, the elastic body and the cap, and the cap and the second component are always maintained in close contact with each other by the restoring force of the elastic body. Accordingly, it is possible to reduce, for example, breakage and deterioration of the elastic body caused due to sliding movement between the components while obtaining followability between the components by the elastic body with respect to the movement of the components toward and away from each other.

In an embodiment, the cap may include a polytetrafluoroethylene material. In this manner, in the cap, a polytetrafluoroethylene material, which is excellent in slidability, may be used.

In an embodiment, the seal member including the first component, the elastic body and the cap is slidingly movable with respect to the second component along the second surface, and the movement of the seal member along the second surface relative to the second component switches between the connection between the first through hole and the second through hole and the release of this connection. In this way, since the seal member including the first component, the elastic body, and the cap is slidingly movable with respect to the second component, it is possible to smoothly perform connection between the first through hole of the first component and the second through hole of the second component and release of this connection by moving the seal member along the second surface of the second component.

In another aspect, a method for sealing a gas flow path is provided. The flow path is defined by connecting a first through hole of a first component and a second through hole of a second component. The method includes: installing an elastic body having a loop shape in a groove in a first surface of the first component so as to protrude from the first surface, and arranging the elastic body such that a first opening of the first through hole overlaps with a second opening of the loop shape of the elastic body when viewed from above the first surface; installing a cap having a third opening on the elastic body while covering the elastic body such that the first opening, the second opening, and the third opening overlap with each other when viewed from above the first surface, and fitting the cap into the groove in the first surface; and defining the flow path by assembling the first component and the second component via the elastic body and the cap such that the first through hole and the second through hole are connected to each other and bringing the cap into close contact with a second surface of the second component. In this way, in the method described above, since the cap is fitted into the groove in the first surface while covering the elastic body, friction and shearing caused by the sliding of the components occur in the cap. That is, since the cap covers the elastic body installed on the first component with respect to the second component, the elastic body does not come into direct contact with the second component. Therefore, even when the first component and the second component slide relative to each other, the movement does not affect the elastic unit. In addition, since the cap unit is in close contact via the elastic unit, the movement of the components toward and away from each other is absorbed by the expansion and contraction of the elastic body, and thus the sealing of the gas flow path is maintained. That is, the first component and the elastic body, the elastic body and the cap, and the cap and the second component are always maintained in close contact with each other by the restoring force of the elastic unit. Accordingly, it is possible to reduce, for example, breakage and deterioration of the elastic unit caused due to sliding movement between the flow path components while obtaining followability between the components by the elastic body with respect to the movement of the flow path components toward and away from each other.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 1A and 1B are cross-sectional views exemplifying two aspects of a seal structure according to an embodiment.

FIGS. 7A and 7B are cross-sectional views exemplifying two different variations of a seal structure according to the embodiment.

DETAILED DESCRIPTION

Figure 2:
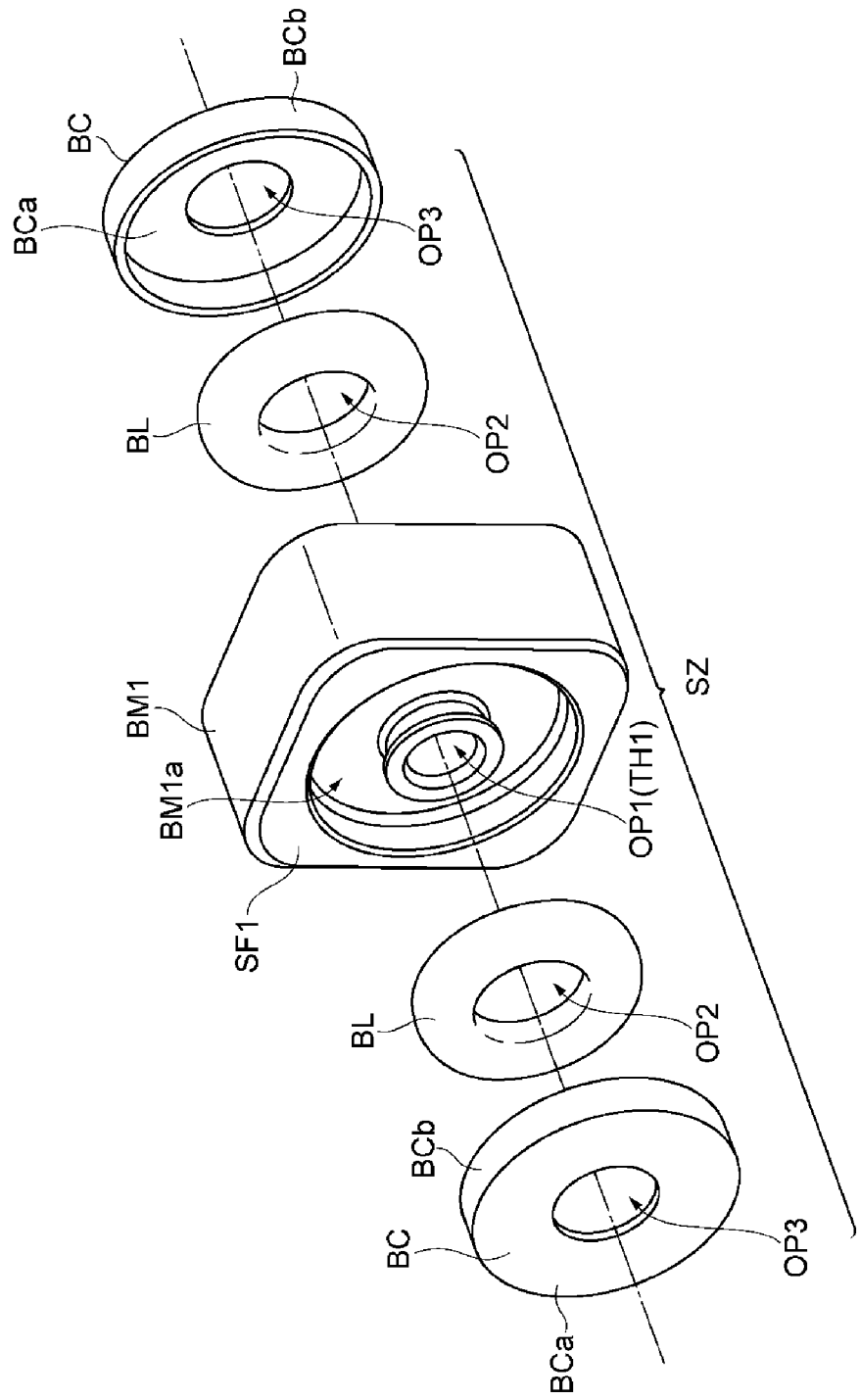
FIG. 2 is an exploded perspective view exemplifying components used for the seal structure according to the embodiment.

In the following detailed description, reference is made to the accompanying drawing, which form a part hereof. The illustrative embodiments described in the detailed description, drawing, and claims are not meant to be limiting. Other embodiments may be utilized, and other changes may be made without departing from the spirit or scope of the subject matter presented here.

Hereinafter, various embodiments will be described in detail with reference to the drawings. In each of the drawing, the same or corresponding components will be denoted by the same reference numerals. Hereinafter, the first to eighth embodiments will be illustrated, but the respective configurations of the first to eighth embodiments may be at least partially combined.

First Embodiment

Figure 3:
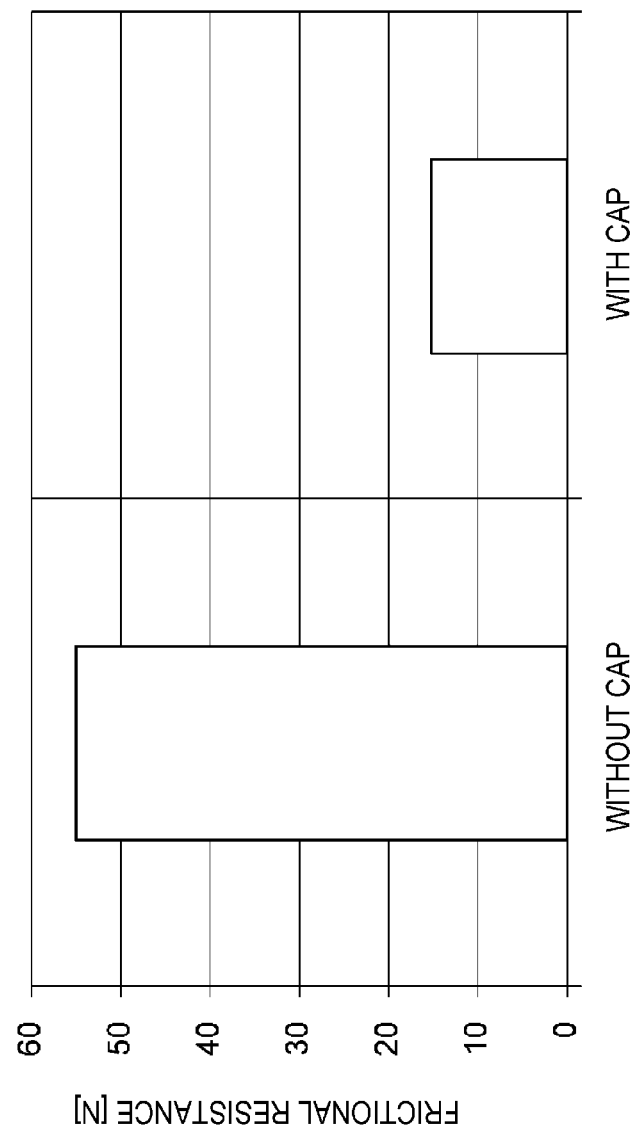
FIG. 3 is a graph for describing the effect of the seal structure according to the embodiment.

First, a seal structure SE will be described with reference to FIGS. 1A, 1B, 2, and 3. FIGS. 1A and 1B are cross-sectional views exemplifying two aspects of a seal structure SE according to an embodiment. FIG. 2 is an exploded perspective view exemplifying components used for the seal structure SE according to the embodiment. FIG. 3 is a graph for describing the effect of the seal structure SE according to the embodiment.

A difference between the configuration illustrated in FIG. 1B and the configuration illustrated in FIG. 1B is only the shape of the component surrounding a flow path component BM1. This difference will be described. In the case of the configuration illustrated in FIG. 1A, the flow path component BM1 is surrounded only by two portions of a flow path component BM2 (a portion BM2a and a portion BM2b), but in the case of the configuration illustrated in FIG. 1B, the flow path component BM1 is surrounded by two portions of the flow path component BM2 (a portion BM2a and a portion BM2b) and two portions of a flow path component BM3 (a portion BM3a and a portion BM3b). In the case of the configuration illustrated in FIG. 1B, while the two portions of the flow path component BM2 (the portion BM2a and the portion BM2b) are in contact with a cap component BC which will be described later, but the two portions of the flow path component BM3 (the portion BM3a and the portion BM3b) are not in contact with the cap unit BC. In the case of the configuration illustrated in FIG. 1B, the flow path component BM1 is sandwiched between the two portions of the flow path component BM3 (the portion BM3a and the portion BM3b) in the direction DB along the boundary CN between the portion BM2a and the portion BM2b. A boundary CN corresponds to a boundary between components (which corresponds to the region (portion) where the components face each other and may also be referred to as, for example, a "boundary" (in this specification, the same is applied to the meaning of a boundary between components, which is used hereinafter). A space SC in which the flow path component BM1 is provided is defined by the two portions of the flow path component BM2 (the portion BM2a and the portion BM2b) in the cross section illustrated in FIG. 1A, and is defined by the two portions (the portion BM2a and the portion BM2b) of the flow path component BM2 and the two portions of the flow path component BM3 (the portion BM3a and the portion BM3b) in the cross section illustrated in FIG. 1B.

As illustrated in FIGS. 1A and 1B, the seal structure SE is a structure that seals a gas flow path GL (a flow path of a gas). In the gas flow path GL, the gas flows in a direction DA. The direction DA is defined as a direction in which the gas flows. As illustrated in FIG. 1A, the seal structure SE includes a flow path component BM1 (a first component), a flow path component BM2 (a second component), an elastic unit BL, and a cap unit BC, and the flow path component BM1 and the flow path component BM2 are assembled so as to define the gas flow path GL. The flow path component BM2 includes a portion BM2a and a portion BM2b (the name of the flow path component BM2 is used to collectively refer to the name of the portion BM2a and the name of the portion BM2b). As illustrated in FIG. 1B, the seal structure SE includes a flow path component BM1 (a first component), a flow path component BM2 (a second component), a flow path component BM3, an elastic unit BL, and a cap unit BC, and the flow path component BM1 and the flow path component BM2 are assembled so as to define the gas flow path GL, and the flow path component BM3 is assembled so as to surround the flow path component BM1. The flow path component BM3 includes a portion BM3*a* and a portion BM3*b* (the name of the flow path component BM3 is used to collectively refer to the name of the portion BM3*a* and the name of the portion BM3*b*). Due to the above-described reason, in the following description, the first embodiment will be described mainly with reference to the configuration illustrated in FIG. 1A in order to make the description simple.

The flow path component BM1 illustrated in FIG. 1A is removably arranged between the two flow path components BM2 (between the portion BM2*a* and the portion BM2*b*), which are arranged to face each other. The flow path component BM1 illustrated in of FIG. 1B is removably arranged between the two flow path components BM2 (between the portion BM2*a* and the portion BM2*b*), which are arranged to face each other, and between the two flow path components BM3 (between the portion BM3*a* and the portion BM3*b*), which are arranged to face each other.

The elastic unit BL and the cap unit BC are provided in the boundary CN between the flow path component BM1 and the flow path component BM2. In the boundary CN between the flow path component BM1 and the flow path component BM2, the elastic unit BL, the cap unit BC, and the flow path component BM2 are sequentially arranged on the flow path component BM1. As an example, the flow path component BM1, the elastic unit BL, and the cap unit BC may be included in a seal member SZ as illustrated in FIG. 2.

The flow path component BM1 includes a through hole TH1 (first through hole) and a surface SF1 (first surface). The through hole TH1 extends from the surface SF1. The flow path component BM2 includes a through hole TH2 (second through hole) and a surface SF2 (second surface). The through hole TH2 extends from the surface SF2. The front surface SF1 and the front surface SF2 are located in the boundary CN and extend so as to face each other. The boundary CN is defined by the surface SF1 and the surface SF2.

The gas flow path GL is defined by connecting (communicating) the through hole TH1 and the through hole TH2 to each other. The flow path component BM1 and the flow path component BM2 may be arranged such that the through hole TH1 and the through hole TH2 are connected to each other. The gas flow path GL is provided across the portion BM2*a*, the flow path component BM1, and the portion BM2*b*.

The elastic unit BL is in contact with the flow path component BM1 and the cap unit BC. The elastic unit BL has a loop shape. The term "loop shape" means a "deformable loop shape," and may also be referred to as, for example, an "annular shape" or a "ring shape." The loop shape may have a shape in which one hole of a figure such as a circle, an ellipse, or a polygon (e.g., a quadrangle) in plan view (e.g., a circular hole, an elliptical hole, or a polygonal hole (e.g., a quadrangular hole)) is perforated in the center thereof. The three-dimensional shape (stereoscopic shape) of the surface of the loop-shaped elastic unit BL may also be referred to as, for example, a deformable donut shape. In other words, it may be referred to as a deformable torus of which the genus is 1. The elastic unit BL is expandable and contractable, and the shape of the elastic unit BL is continuously changeable by expansion and contraction. The elastic unit BL is provided on the surface SF1 so as to protrude from the front surface SF1. The elastic unit BL is disposed such that the opening OP1 (first opening) of the through hole TH1 overlaps with the wheel-shaped opening OP2 (second opening) of the elastic unit BL when seen from above the surface SF1.

The elastic unit BL is installed in a groove BM1*a* provided in the surface SF1 of the flow path component BM1, thereby being held on the flow path component BM1. The shape of the groove BM1*a* is not limited to a specific shape, as long as the groove BM1*a* is capable of holding the elastic unit BL. The groove BM1*a* has a wheel shape in the surface SF1 and is provided such that the opening OP1 of the through hole TH1 overlaps with the wheel-shaped opening of the groove BM1*a* when viewed from above the surface SF1. The through hole TH1 extends from the loop-shaped opening of the groove BM1*a*.

The cap unit BC has an opening OP3 (third opening). The cap unit BC is disposed on the elastic unit BL. The cap unit BC covers the elastic unit BL such that the opening OP1, the opening OP2, and the opening OP3 overlap with each other when viewed from above the surface SF1. The cap unit BC is fitted into the groove BM1*a* in the front surface SF1.

The direction along the surface SF1 (direction DB) is the direction along the boundary CN. The direction DB along the boundary CN intersects the direction in which the gas flows in the gas flow path GL (the direction DA), and may be approximately orthogonal to the direction DA, for example. The direction DB may be in a direction along the boundary CN, and thus may be an arbitrary direction in a plane intersecting the direction DA (e.g., a plane approximately orthogonal to the direction DA).

The cap unit BC covers the elastic unit BL with respect to the flow path component BM2. The cap unit BC is in contact with the elastic unit BL and the flow path component BM2. The cap unit BC and the flow path component BM2 are in close contact with each other so as to have slidability. More specifically, the cap unit BC includes a plate-shaped portion BCa and a protrusion portion BCb. The plate-shaped portion BCa has an opening OP3 of the cap unit BC. The plate-shaped portion BCa has a shape covering the elastic unit BL with respect to the flow path component BM2.

The protrusion portion BCb is provided on the plate-shaped portion BCa. The protrusion portion BCb protrudes from the plate-shaped portion BCa toward the flow path component BM1. The protrusion portion BCb is fitted into, for example, the groove BM1*a* of the flow path component BM1 in the state of accommodating the elastic unit BL. The protrusion portion BCb is in contact with the side wall furthest away from the through hole TH1, of the two side walls of the groove BM1*a* (in other words, of the two side walls of the groove BM1*a*, the side wall located outside when viewed from the center of the loop shape of the groove BM1*a*). Since the protrusion portion BCb is fitted into the groove BM1*a*, the movement of the cap unit BC with respect to the surface SF1 in the direction DB along the surface SF1 and the boundary CN (an arbitrary direction in a plane intersecting the direction DA of the gas flow path GL) is restricted.

Figure 8A:
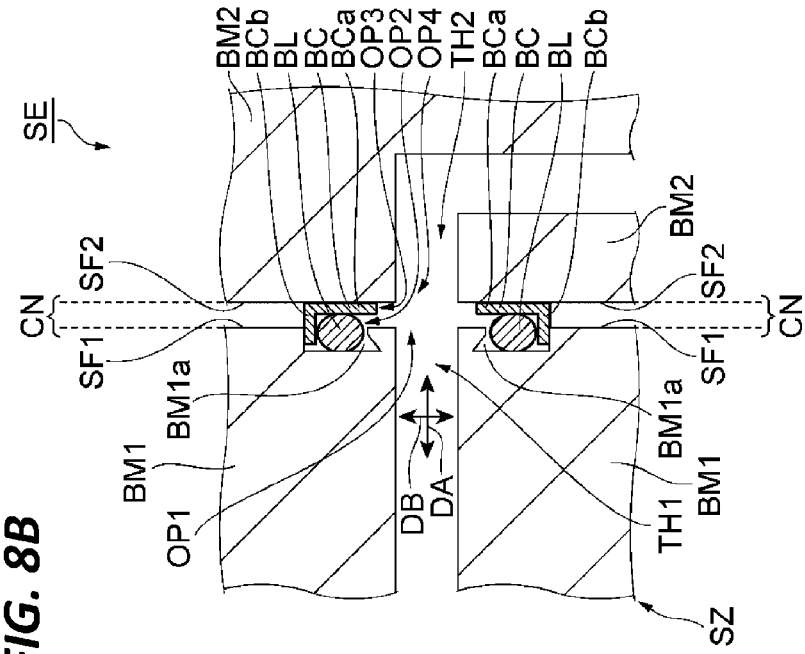
FIGS. 8A and 8B are cross-sectional views exemplifying two different variations of the seal structure according to the embodiment.

Meanwhile, the protrusion portion BCb may protrude in the through hole TH1 (FIG. 7A). In this case, the protrusion portion BCb is in contact with the inner wall of the flow path component BM1 in the through hole H1, and the protrusion portion BCb provided along the outer edge of the plate-shaped portion BCa. In addition, the protrusion portion BCb may be provided along the opening OP3 of the cap unit BC (FIG. 7B and FIG. 8A).

In addition, as illustrated in FIG. 2, the protrusion portion BCb is provided on the outer edge of the plate-shaped portion BCa (or the edge of the opening OP3) in a continuous wall shape (a band shape). However, without being limited thereto, the protrusion portion BCb may be constituted by a plurality of protrusions provided at substantially equal intervals on, for example, the outer edge of the plate-shaped portion BCa (or the edge of the opening OP3), as long as the shape of the protrusion portion BCb is capable of restricting the movement of the cap BC relative to the direction DB along the surface SF1 and the boundary CN (an arbitrary direction in a plane intersecting the direction DA of the gas flow path GL).

The groove BM1a is provided in the surface SF1 of the flow path component BM1. The groove BM1a has a loop shape and is provided so as to surround the periphery of the opening OP1 of the through hole TH1. The opening OP1 is located inside the loop-shaped opening of the groove BM1a.

The through hole TH1 is connected to the opening OP2 of the elastic unit BL and the opening OP3 of the cap unit BC via the opening OP1. When the through hole TH1 is connected to the through hole TH2 of the flow path component BM2, the through hole TH1 is connected to the through hole TH2 via the opening OP1, the opening OP2, the opening OP3, and the opening OP4 of the through hole TH2. The opening OP4 of the through hole TH2 is provided in the surface SF2 of the flow path component BM2.

The material of the cap unit BC has a relatively small frictional coefficient with respect to the flow path component BM2. FIG. 3 represents a result obtained by comparing frictional resistances N in the direction along the boundary CN between the flow path component BM1 and the flow path component BM2 (that is, the direction along the surface SF1 and the surface SF2) in the case in which the seal structure SE according to an embodiment is used (a cap is present) and in the case in which the cap unit BC of the seal structure SE is not used (a cap is not present). The vertical axis in FIG. 3 represents a frictional resistance [N].

As represented in FIG. 3, the frictional resistance [N] between the cap unit BC and the surface SF2 in the seal structure SE in which the cap unit BC covering the elastic unit BL is in close contact with the surface SF2 of the flow path component BM2 is smaller than the frictional resistance [N] between the elastic unit BL and the surface SF2 in the structure in which the elastic unit BL is in direct contact with the surface SF2 of the flow path component BM2 without using the cap unit BC.

In an embodiment, the cap unit BC, which may generates a frictional resistance [N] as represented in FIG. 3, may be made of, for example, PTFE (polytetrafluoroethylene), PFA (tetrafluoroethylene-perfluoropropylvinyl ether copolymer), PI (polyimide), PEEK (polyether ether ketone), or UHMWPE (ultrahigh-molecular weight polyethylene) in view of friction reduction on a contact surface, resistance to an isolating chemical, and flexible followability with respect to the contact surface. Further, POM (polyacetal) or MC nylon (registered trademark) may also be used as the material of the cap unit BC depending on the kind of a chemical to be used. The elastic unit BL has an elastic material, and may be, for example, an O-ring. The elastic unit BL can also be a packing or a dust seal.

Figure 4:
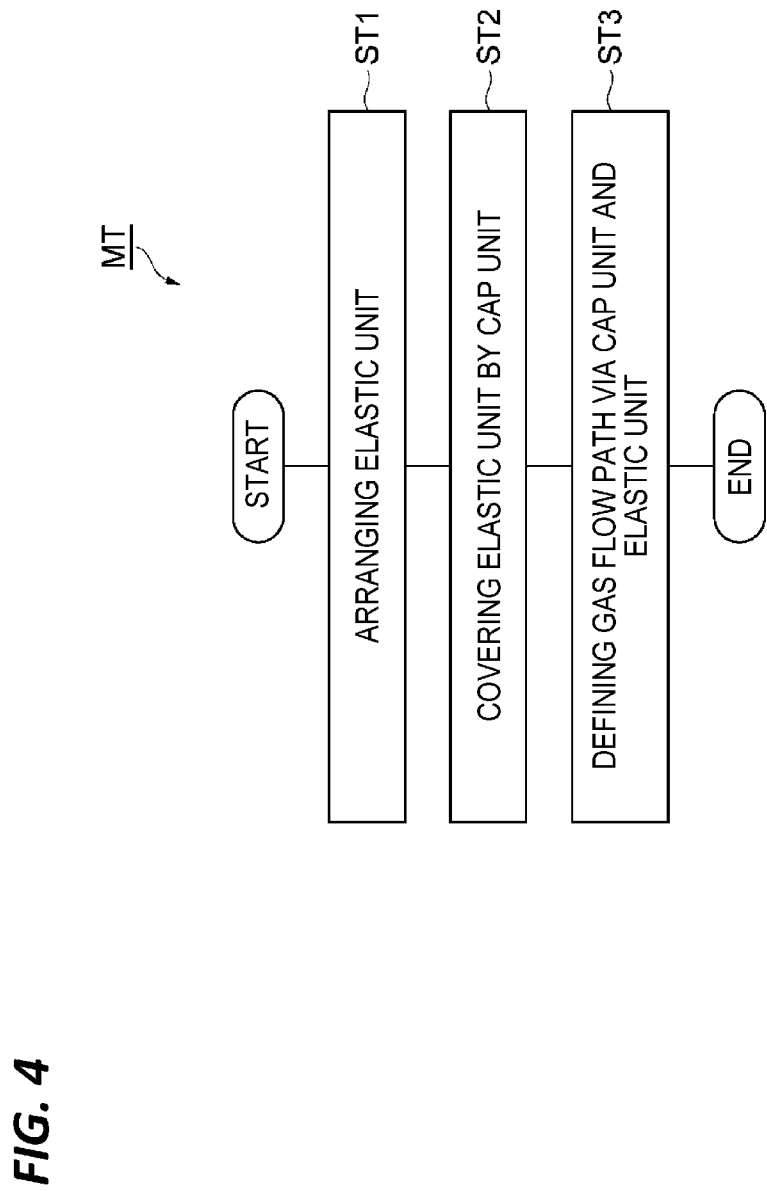
FIG. 4 is a flowchart illustrating an example of a seal method according to an embodiment.

Next, further referring to FIG. 4, a seal method MT according to an embodiment will be described. FIG. 4 is a flowchart illustrating an example of the seal method MT according to an embodiment. The seal method MT is a method of sealing a gas flow path GL. For example, as illustrated in FIG. 4, the seal method MT includes steps ST1 to ST3. The gas flow path GL is defined by connecting the through hole TH1 and the through hole TH2.

In step ST1, first, the elastic unit BL is disposed. More specifically, the loop-shaped elastic unit BL is installed in the groove BM1a in the front surface SF1 so as to protrude from the surface SF1 of the flow path component BM1, and arranged such that the opening OP1 of the through hole TH1 of the flow path component BM1 overlaps with the loop-shaped opening OPT in the elastic unit BL when viewed from above the surface SF1.

In step ST2 subsequent to step ST1, the elastic unit BL is covered with the cap unit BC. More specifically, the cap unit BC having the opening OP3 is installed on the elastic unit BL while covering the elastic unit BL and is fitted into the groove BM1a in the surface SF1 such that the opening OP1, the opening OP2, and the opening OP3 overlap with each other when viewed from above the surface SF1.

In step ST3 subsequent to step ST2, the gas flow path GL is defined using the cap unit BC and the elastic unit BL. More specifically, the flow path component BM1 and the flow path component BM2 are assembled via the elastic unit BL and the cap unit BC such that the through hole TH1 is connected (communicates) with the through hole TH2, and the cap unit BC is brought into close contact with the surface SF2 of the flow path component BM2 so as to define the gas flow path GL. In this way, the gas flow path GL is sealed to the outside of the gas flow path GL.

By executing steps ST1 to ST3 described above, for example, the seal structure SE illustrated in each of FIGS. 1A and 1B may be fabricated.

Figure 5:
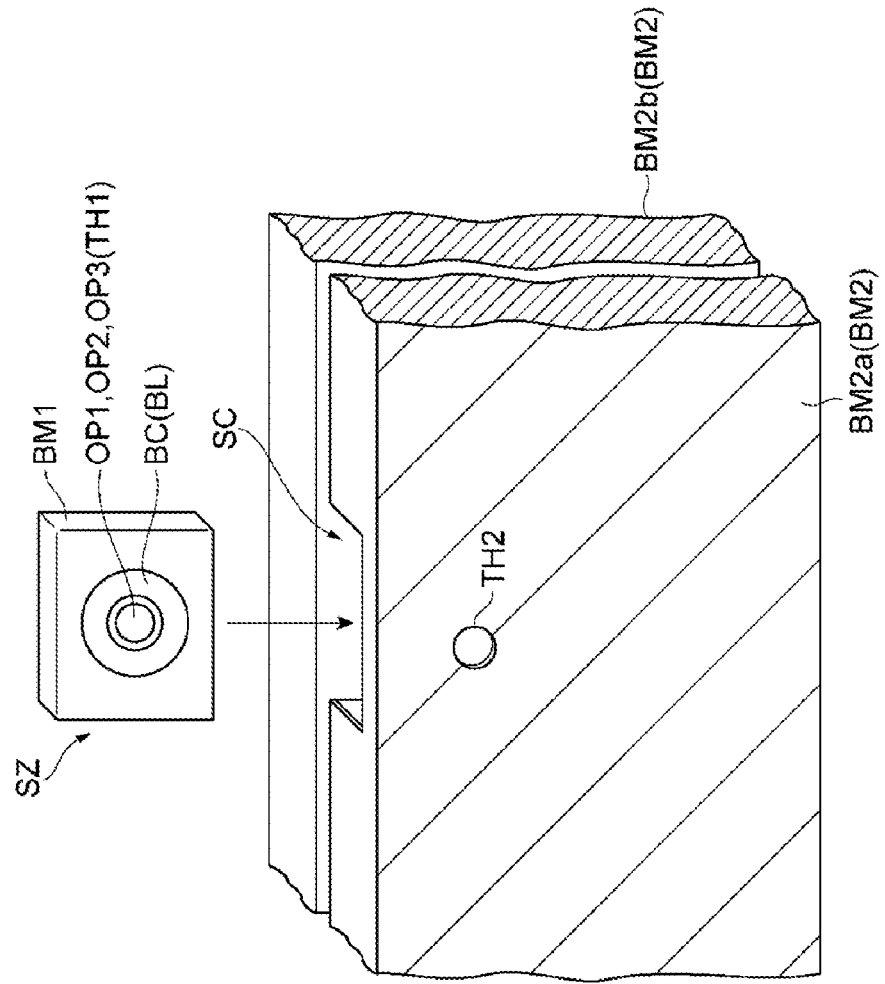
FIG. 5 is a view for describing how to use a seal member in the seal structure according to the embodiment.

As illustrated in FIG. 2, when the flow path component BM1, the elastic unit BL, and the cap unit BC are included in the seal member SZ, the seal member SZ is used in the state of being fitted in the boundary space between the two flow path components BM2 that define the gas flow path GL, as illustrated in FIG. 5. FIG. 5 is a view for describing how to use the seal member SZ in the seal structure SE according to the embodiment.

Since the cap unit BC made of a material having a relatively small frictional coefficient with respect to the surface SF2 of the flow path component BM2 is provided on the surface of the seal member SZ, the seal member SZ is capable of being relatively smoothly fitted into the boundary space SC between the two portions of the flow path component BM2 (the portion BM2a and the portion BM2b). As a result, the through hole TH1 in the flow path component BM1 and the through hole TH2 in the flow path component BM2 are connected to define the gas flow path GL. Since the elastic unit BL is provided around the gas flow path GL, the gas flow path GL is capable of being sufficiently sealed with respect to the outside of the gas flow path GL. As illustrated in FIG. 5, the seal member SZ including the flow path component BM1, the elastic unit BL, and the cap unit BC is insertable into and removable from the space SC defined by, for example, the two portions of the flow path component BM2 (the portion BM2a and the portion BM2b).

Figure 6:
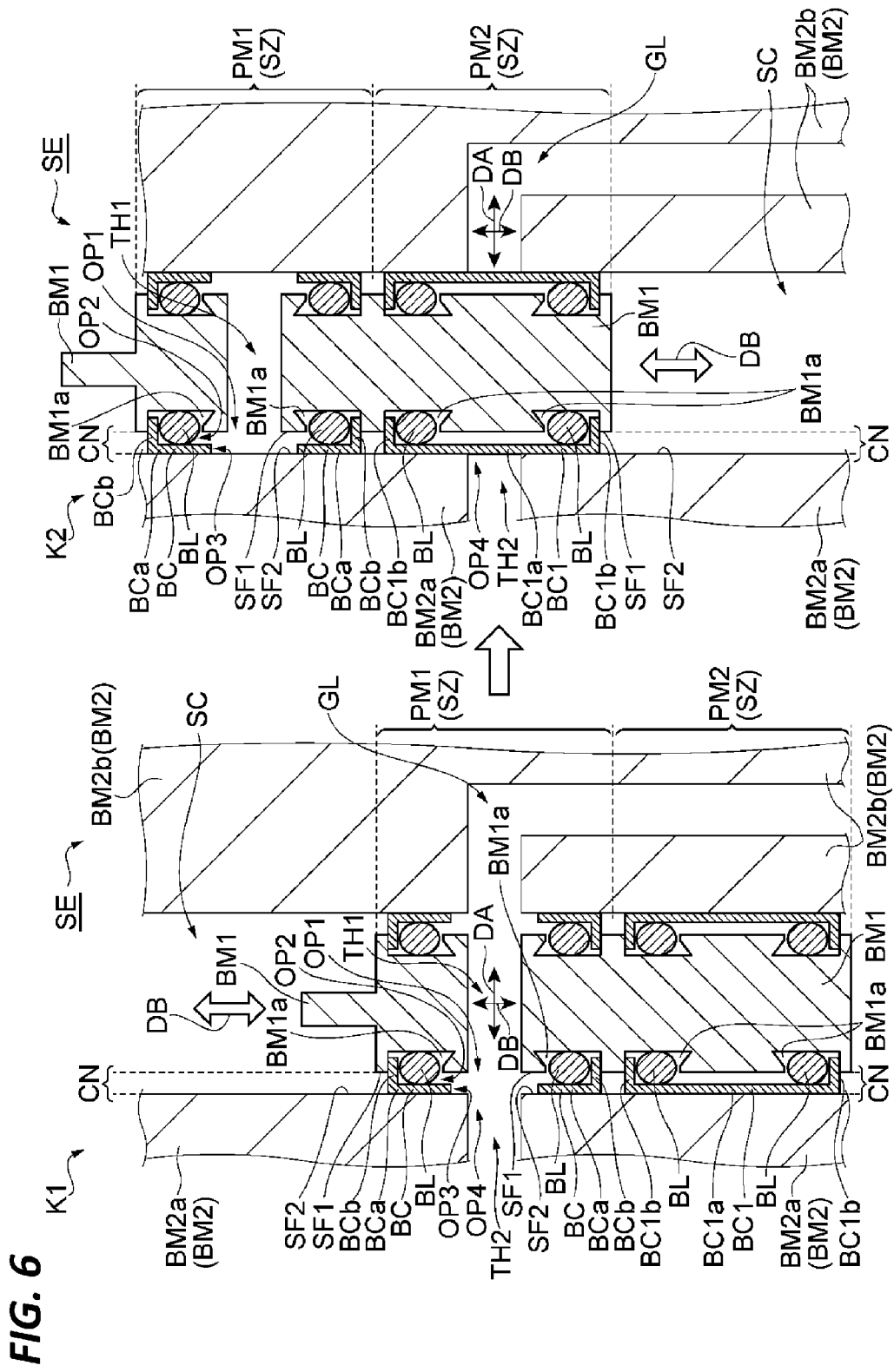
FIG. 6 is a cross-sectional view illustrating another variation of the seal structure according to the embodiment.
Figure 8B:
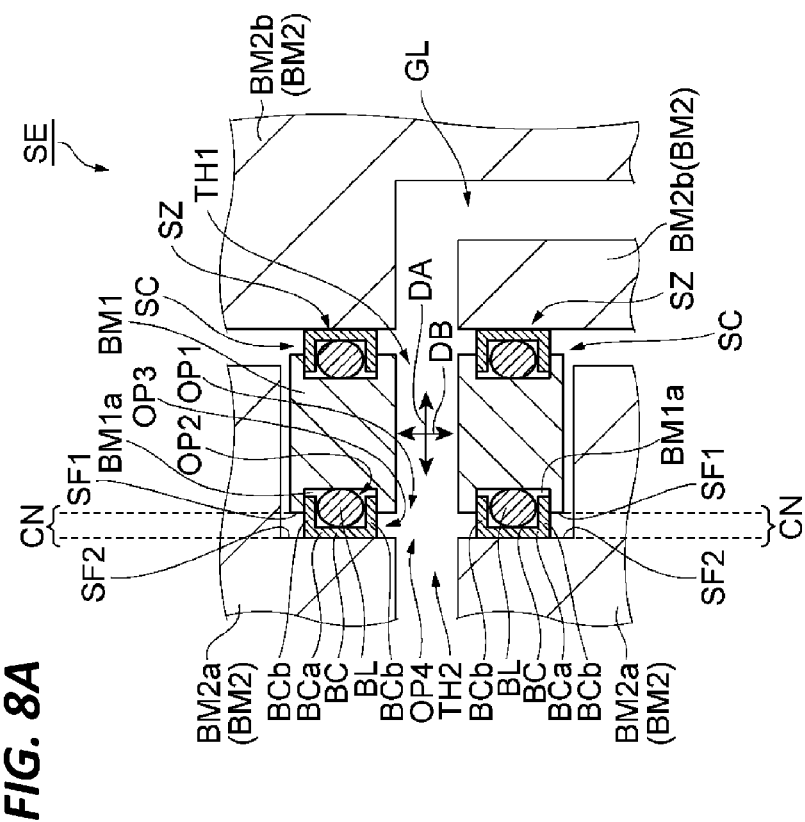
Figure 9:
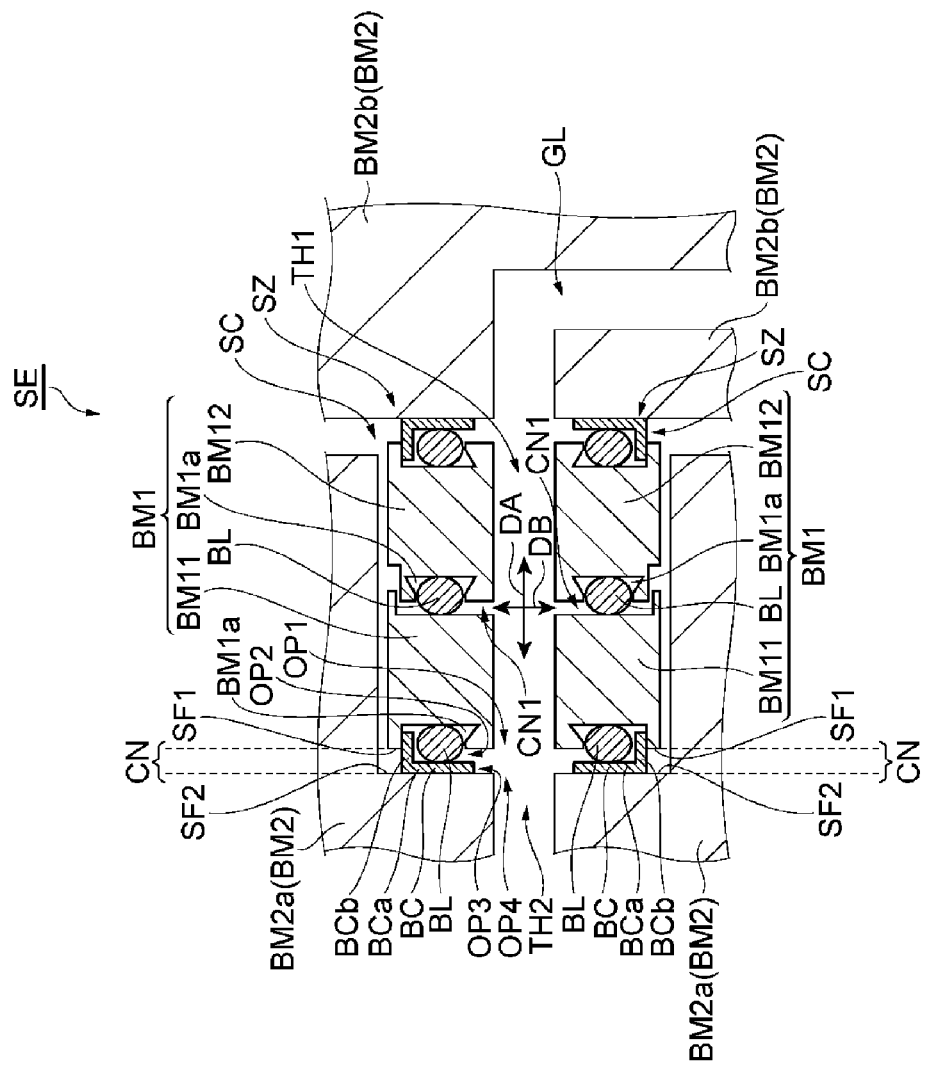
FIG. 9 is a cross-sectional view illustrating another variation of the seal structure according to the embodiment.
Figure 10:
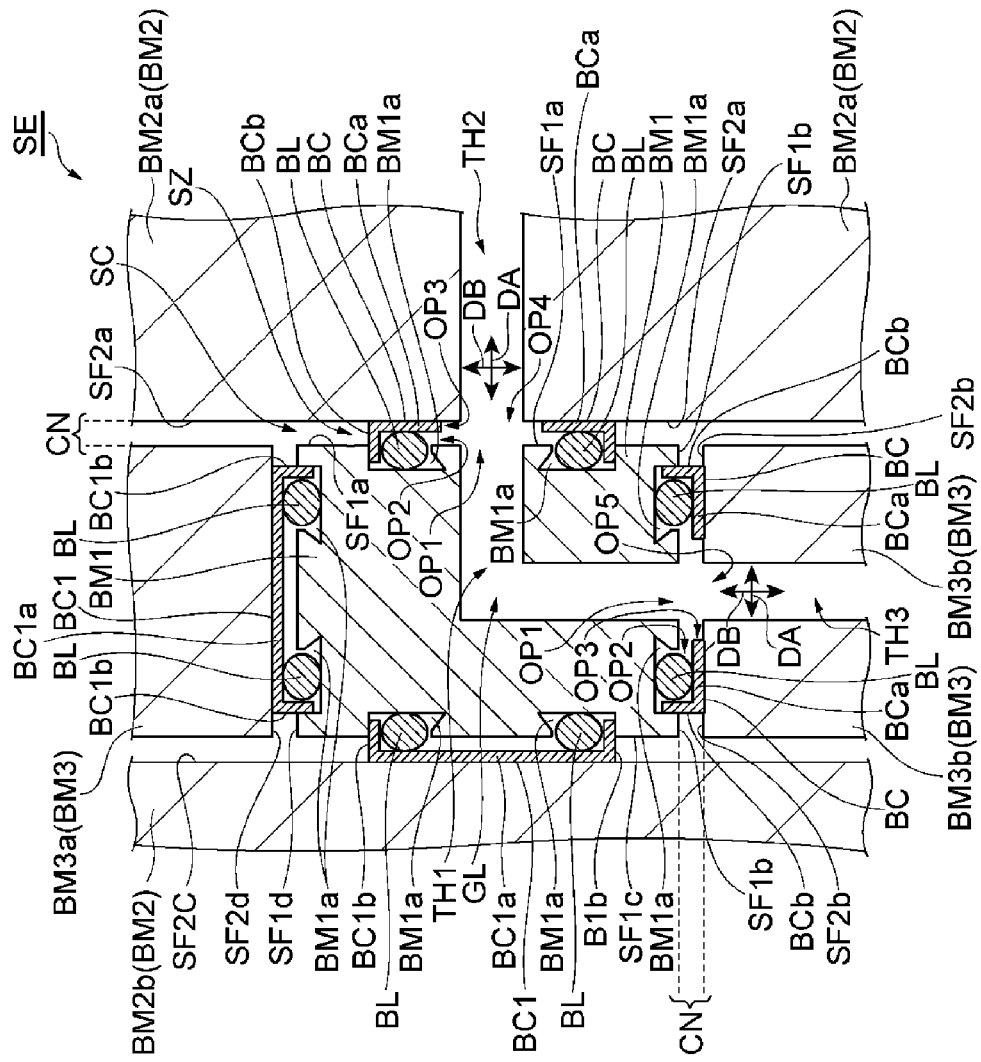
FIG. 10 is a cross-sectional view exemplifying another variation of the seal structure according to the embodiment.

The seal structure SE capable of being used in an embodiment is not limited to the aspect illustrated in FIGS. 1A and 1B. The seal structure SE capable of being used in an embodiment is, for example, a seal structure SE of an aspect illustrated in each of FIG. 6, FIG. 7A, FIG. 7B, FIG. 8A, FIG. 8B, FIG. 9, and FIG. 10. FIG. 6 is a cross-sectional view illustrating another variation of the seal structure SE according to the embodiment. FIGS. 7A and 7B are cross-sectional views exemplifying two different variations of the seal structure SE according to the embodiment. FIGS. 8A and 8B are cross-sectional views exemplifying two different variations of the seal structure SE according to the embodiment. FIG. 9 is a cross-sectional view exemplifying another variation of the seal structure SE according to the embodiment. FIG. 10 is a cross-sectional view exemplifying another variation of the seal structure SE according to the embodiment.

Second Embodiment

The seal member SZ of the seal structure SE illustrated in FIG. 6 includes a first portion PM1 and a second portion PM2. The seal member SZ illustrated in FIG. 6, which includes the first portion PM1 and the second portion PM2, is slidable with respect to the flow path component BM2 along the surface SF2 (in other words, in the direction along the space SC between two flow path components BM2 between which the seal member SZ illustrated in FIG. 6 is interposed). The first portion PM1 and the second portion PM2 are arranged in order along the boundary CN (along the surface SF2) in the space SC.

The configuration of the first portion PM1 is the same as that of the seal member SZ illustrated in FIGS. 1A and 1B. The first portion PM1 includes the flow path component BM1, the elastic unit BL, and the cap unit BC illustrated in FIGS. 1A and 1B. Of the flow path component BM1 of the seal member SZ illustrated in FIG. 6, the portion included in the first portion PM1 has the same configuration as that of the flow path component BM1 illustrated in FIGS. 1A and 1B, and has a through hole TH1. Of the flow path component BM1 of the seal structure SE illustrated in FIG. 6, the portion included in the second portion PM2 does not have a through hole. Like the first portion PM1, the second portion PM2 has the elastic unit BL provided on the surface SF1.

In the second portion PM2, the elastic unit BL is covered with the cap unit BC1. In the second portion PM2, the elastic unit BL is in contact with the flow path component BM1 and the cap unit BC1. In the second portion PM2, the elastic unit BL is provided on the surface SF1 so as to protrude from the surface SF1. In the second portion PM2, the elastic unit BL is installed in a groove BM1a provided in the surface SF1 of the flow path component BM1, thereby being held on the flow path component BM1.

The second portion PM2 includes the cap unit BC1 without including the cap unit BC of the first portion PM1. Unlike the cap unit BC having the opening OP3, the cap unit BC1 does not have an opening. The cap unit BC1 is disposed on the elastic unit BL. The cap unit BC is fitted into the groove BM1a in the front surface SF1.

The cap unit BC1 covers the elastic unit BL of the second portion PM2 with respect to the flow path component BM2. The cap unit BC1 is in contact with the elastic unit BL of the second portion PM2 and the flow path component BM2. The cap unit BC1 and the flow path component BM2 are in close contact with each other so as to have slidability. More specifically, the cap unit BC1 includes a plate-shaped portion BC1a and a protrusion portion BC1b like the cap unit BC.

The protrusion portion BC1b protrudes from the plate-shaped portion BC1a toward the flow path component BM1. In the second portion PM2, the protrusion portion BC1b is fitted into, for example, the groove BM1a in the flow path component BM1 in the state of accommodating the elastic unit BL. In the second portion PM 2, since the protrusion portion BC1b is fitted into the groove BM1a, the movement of the cap unit BC1 with respect to the direction DB along the surface SF1 and the boundary CN is restricted.

Like the cap unit BC, the cap unit BC1 has relatively high flexibility, relatively high chemical resistance to the gas flowing through the gas flow path GL, and a relatively small frictional coefficient with respect to the flow path component BM2. The material of the cap unit BC1 may be the same as, for example, the material of the cap unit BC. In an embodiment, the cap unit BC1 may include a material such as, for example, polytetrafluoroethylene.

In the seal structure SE illustrated in FIG. 6, the movement of the seal member SZ illustrated in FIG. 6 along the surface SF2 with respect to the flow path component BM2 is capably of relatively smoothly switching between the connection between the through hole TH1 and the through hole TH2 and release of this connection. In the seal structure SE illustrated in FIG. 6, the aspect in which the through hole TH1 and the through hole TH2 are connected to each other is the aspect K1 illustrated in FIG. 6. In the seal structure SE illustrated in FIG. 6, the aspect in which the connection between the through hole TH1 and the through hole TH2 is released is the aspect K2 illustrated in FIG. 6.

The flow path component BM1 illustrated in FIG. 6 is removably arranged between two flow path components BM2 (between the portion BM2a and the portion BM2b), which are arranged to face each other.

Third Embodiment

The seal structure SE illustrated in FIG. 7A is different from the seal structure SE illustrated in FIG. 1A only in the configuration of the cap unit BC of the seal member SZ, and is the same as the seal structure SE illustrated in FIG. 1A in the other configurations except for the cap unit BC. The cap unit BC illustrated in FIG. 7A and the cap unit BC illustrated in FIG. 1A are different from each other in terms of the arrangement of the protrusion portion BCb, but are similar to each other, except for the arrangement of the protrusion portion BCb.

In the cap unit BC illustrated in FIG. 7A, the protrusion portion BCb protrudes from the plate-shaped portion BCa toward the flow path component BM1. In the cap unit BC illustrated in FIG. 7A, the protrusion portion BCb is fitted into the through hole TH1 through the opening OP1 of the through hole TH1 of the flow path component BM1. In the cap unit BC illustrated in FIG. 7A, the protrusion portion BCb is in contact with the inner wall of the through hole TH1 from the opening OP1. In the seal structure SE illustrated in FIG. 7A, the movement of the cap unit BC with respect to the direction DB along the front surface SF1 and the boundary CN is restricted since the protrusion portion BCb is fitted into the through hole TH1.

Fourth Embodiment

The seal structure SE illustrated in FIG. 7B is different from the seal structure SE illustrated in FIG. 1A only in the configuration of the cap unit BC of the seal member SZ, and is the same as the seal structure SE illustrated in FIG. 7B in the other configurations, except for the cap unit BC. The cap unit BC illustrated in FIG. 7B and the cap unit BC illustrated in FIG. 1B are different from each other in terms of the arrangement of the protrusion portion BCb, but are similar to each other, except for the arrangement of the protrusion portion BCb. The shape of the groove BM1a is not limited to a specific shape, as long as the groove BM1a is capable of holding the elastic unit BL.

In the cap unit BC illustrated in FIG. 7B, the protrusion portion BCb protrudes from the plate-shaped portion BCa toward the flow path component BM1. In the cap unit illustrated in FIG. 7B, the protrusion portion BCb is fitted into, for example, the groove BM1a in the flow path component BM1 in the state of accommodating the elastic unit BL. In the cap unit BC illustrated in FIG. 7B, the protrusion portion BCb is in contact with the side wall closest to the through hole TH1, of the two side walls of the groove BM1a (of the two side walls of the groove BM1a, the side wall located at the side of the through hole TH1, in other words, of the two side walls of the groove BM1a, the side wall located inside when viewed from the center of the loop shape of the groove BM1a). In the seal structure SE illustrated in FIG. 7B, the movement of the cap unit BC with respect to the direction DB along the front surface SF1 and the boundary CN is restricted since the protrusion portion BCb is fitted into the groove BM1a.

The flow path component BM1 illustrated in FIG. 7A is removably arranged between the two flow path components BM2 (between the portion BM2a and the portion BM2b), which are arranged to face each other. The flow path component BM1 illustrated in of FIG. 7B is removably arranged between the two flow path components BM2 (between the portion BM2a and the portion BM2b), which are arranged to face each other, and between the two flow path components BM3 (between the portion BM3a and the portion BM3b), which are arranged to face each other.

Fifth Embodiment

The seal structure SE illustrated in FIG. 8A is different from the seal structure SE illustrated in FIG. 1A only in the configuration of the cap unit BC of the seal member SZ, and is the same as the seal structure SE illustrated in FIG. 1A in the other configurations, except for the cap unit BC. The cap unit BC illustrated in FIG. 8A and the cap unit BC illustrated in FIG. 1A are different from each other in terms of the arrangement of the protrusion portion BCb, but are similar to each other, except for the arrangement of the protrusion portion BCb. The shape of the groove BM1a is not limited to a specific shape, as long as the groove BM1a is capable of holding the elastic unit BL.

In the cap unit BC illustrated in FIG. 8A, the protrusion portion BCb protrudes from the plate-shaped portion BCa toward the flow path component BM1. In the cap unit BC illustrated in FIG. 8A, the protrusion portion BCb includes: a portion that is in contact with the side wall closest to the through hole TH1, of the two side walls of the groove BM1a (of the two side walls of the groove BM1a, the side wall located at the side of the through hole TH1, in other words, of the two side walls of the groove BM1a, the side wall located inside when viewed from the center of the loop shape of the groove BM1a); and a portion that is in contact with the side wall furthest away from the through hole TH1, of the two side walls of the groove BM1a (in other words, of the two side walls of the groove BM1a, the side wall located outside when viewed from the center of the loop shape of the groove BM1a).

In the seal structure SE illustrated in FIG. 8A, the movement of the cap unit BC with respect to the direction DB along the front surface SF1 and the boundary CN is restricted since the protrusion portion BCb is fitted into the through hole TH1. Since the protrusion portion BCb is in contact with the inner side surface and the outer side surface of the groove BM1a in the flow path component BM1, the cap unit BC is firmly held by the flow path component BM1, so that the cap unit BC is capable of effectively protecting the elastic unit BL against the movement of the flow path component BM1 along the boundary CN.

The flow path component BM1 illustrated in FIG. 8A is removably arranged between the two flow path components BM2 (between the portion BM2a and the portion BM2b), which are arranged to face each other.

Sixth Embodiment

In the seal structure SE illustrated in FIG. 8B, the seal member SZ, which includes the flow path component BM1, the elastic unit BL, and the cap unit BC, is includes a configuration which is not insertable nor removable with respect to the flow path component BM2, unlike the case illustrated in FIG. 5.

Seventh Embodiment

The seal structure SE illustrated in FIG. 9 is different from the seal structure SE illustrated in FIG. 1A only in the configuration of the flow path component BM1 of the seal member SZ, and is the same as the seal structure SE illustrated in FIG. 1A in the other configurations, except for the flow path component BM1.

The flow path component BM1 illustrated in FIG. 9 includes a first portion BM11 and a second portion BM12. The first portion BM11 and the second portion BM12 are arranged side by side in the direction DA along the gas flow path GL. In the boundary CN1 between the first portion BM11 and the second portion BM12, an elastic unit BL is provided. The first portion BM11 and the second portion BM12 are assembled so as to define the gas flow path GL via the elastic unit BL provided in the boundary CN1.

The elastic unit BL provided in the boundary CN1 is provided in the groove BM1a provided in the second portion BM12. The elastic unit BL provided in the boundary CN1 and the groove BM1a provided in the second portion BM12 are arranged such that the gas flow path GL penetrates the opening of the elastic unit BL and the opening of the groove BM1a, as in the configuration illustrated in FIG. 1A.

The elastic unit BL installed in the boundary CN1 is in direct contact with the first portion BM11. The elastic unit BL installed in the boundary CN1 is held by the second portion BM12. The elastic unit BL installed in the boundary CN1 is in close contact with the surface of the first portion BM11.

Therefore, according to the elastic unit BL provided in the boundary CN1, it is possible to avoid flowing-out of the gas in the gas flow path GL to the outside of the gas flow path GL through the boundary CN1. As described above, even in the case where the flow path component BM1 includes the two portions (the first portion BM11 and the second portion BM12), since the elastic unit BL is provided around the gas flow path GL, the gas flow path GL is capable of being sufficiently effectively sealed with respect to the outside of the gas flow path GL. In the seal member SZ illustrated in FIG. 9, since the first portion BM11 and the second portion BM12 are assembled so as to define the gas flow path GL through the elastic unit BL, the entire shape of the seal member SZ is able to be flexibly deformed according to, for example, the deformation even in the case where, for example, the deformation of the flow path component BM2 surrounding the seal member SZ occurs.

The flow path component BM1 illustrated in FIG. 9 is removably arranged between the two flow path components BM2 (between the portion BM2a and the portion BM2b), which are arranged to face each other.

The configuration in which the flow path component BM1 includes two portions (the first portion BM11 and the second portion BM12) is illustrated in FIG. 9. However, without being limited thereto, the flow path component BM1 may include three or more portions including the first portion BM11 and the second portion BM12. For example, in the case where the flow path component BM1 includes three portions including the first portion BM11 and the second portion BM12, another portion (referred to as a "third portion") is disposed between the first portion BM11 and the second portion BM12. The first portion BM11, the third portion, and the second portion BM12 are arranged side by side in this order. In this case, between the first portion BM11 and the third portion, the elastic unit BL is provided on the side of the third portion like the second portion BM12 illustrated in FIG. 9, and between the third portion and the flow path component BM2, the elastic unit BL is on the side of the second portion BM12 like the second portion BM12 illustrated in FIG. 9. Likewise, the flow path component BM1 may include four or more portions including the first portion BM11, the second portion BM12, and the third portion.

Eighth Embodiment

In the seal structure SE illustrated in FIG. 10, like the seal structure SE illustrated in FIG. 1B and FIG. 7B, the seal member SZ including the flow path component BM1 is surrounded by the two portions of the flow path component BM2 (the portions BM2a and the portion BM2b) and the two portions of the flow path component BM3 (the portion BM3a and the portion BM3b). However, in the seal structure SE illustrated in FIG. 10, unlike the seal structure SE illustrated in each of FIG. 1B and FIG. 7B, the gas flow path GL is formed over the portion BM2a of the flow path component BM2, the flow path component BM1, and the portion BM3b of the flow path component BM3.

In the seal structure SE illustrated in FIG. 10, all of the four surfaces of the flow path component BM1 as seen from the cross section illustrated in FIG. 10 (i.e., all of a surface SF1a of the flow path component BM1 facing a surface SF2a of the portion BM2a, a surface SF1b of the flow path component BM1 facing a surface SF2b of the portion BM3b, a surface SF1c of the flow path component BM1 facing a surface SF2c of the portion BM2b, and a surface SF1d of the flow path component BM1 facing a surface SF2d of the portion BM3a) are provided with an elastic unit BL.

In the seal member SZ illustrated in FIG. 10, the cap units BC are fitted into the grooves BM1a in the surfaces of the flow path component BM1 (the surface SF1a and the surface SF1b) facing the portion BM2a and the portion BM3b, and the cap units BC1 are fitted into the grooves BM1a in the surfaces of the flow path component B1 (the surface SF1c and the surface SF1d) facing the portion BM2b and the portion BM3a.

The flow path component BM1, the flow path component BM2, and the flow path component BM3 may be arranged such that the through hole TH1, the through hole TH2, and the through hole TH3 are connected to each other. The gas flow path GL is defined by connecting (communicating) the through hole TH2 of the portion BM2a, the through hole TH1 of the flow path component BM1, and the through hole TH3 of the portion BM3b.

The gas flow path GL is provided across the portion BM2a, the flow path component BM1, and the portion BM3b. The gas flow path GL reaches the opening OP1 of the through hole TH1 of the flow path component BM1, which faces the opening OP4, from the opening OP4 of the through hole TH2 of the portion BM2a, is directed to the portion BM3b side in the flow path component BM1, and reaches the opening OP5 of the through hole TH3 of the portion BM3b from the opening OP1 of the through hole TH1 of the flow path component BM1, which faces the portion BM3b.

In the seal member SZ illustrated in FIG. 10, on each of the surface SF1a and the surface SF1b of the flow path component BM1 in which the opening OP1 is formed (which intersects the gas flow path GL), a cap unit BC having an opening OP3 is mounted so as to cover the elastic unit BL.

In the seal member SZ illustrated in FIG. 10, on each of the surface SF1c and the surface SF1d of the flow path component BM1 in which the opening OP1 is not formed (which does not intersect the gas flow path GL), a cap unit BC1, which is illustrated in FIG. 6 and does not have an opening such as the opening OP3, is mounted so as to cover the elastic unit BL.

Figure 11:
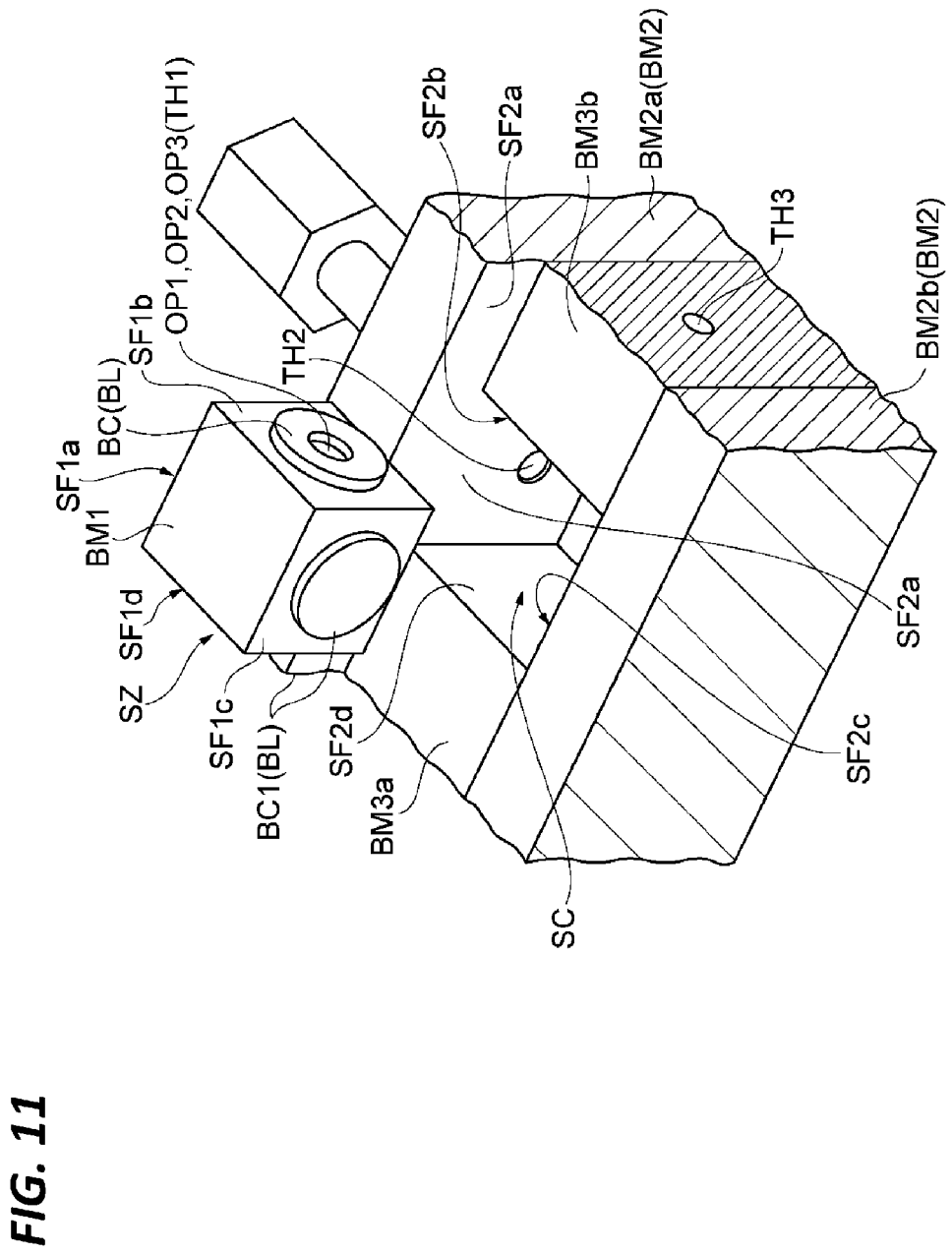
FIG. 11 is a view for describing how to use a seal member in the seal structure illustrated in FIG. 10.

As illustrated in FIG. 11, the seal member SZ illustrated in FIG. 10 is used after being fitted into the boundary space SC between the two portions of the flow path component BM2 (the portion BM2a and the portion BM2b) and the two portion of the flow path component BM3 (the portion BM3a and the portion BM3b). FIG. 11 is a view for describing how to use a seal member SZ in the seal structure SE illustrated in FIG. 10.

As illustrated in FIG. 11, the seal member SZ illustrated in FIG. 10 is insertable into and removable from a space SC defined by, for example, the two portions of the flow path component BM2 (the portion BM2a and the portion BM2b) and the two portions of the flow path component BM3 (the portion BM3a and the portion BM3b).

The flow path component BM1 illustrated in of FIG. 10 is removably arranged between the two flow path components BM2 (between the portion BM2a and the portion BM2b), which are arranged to face each other, and between the two flow path components BM3 (between the portion BM3a and the portion BM3b), which are arranged to face each other.

[Application Example of Seal Structure SE]

Figure 12:
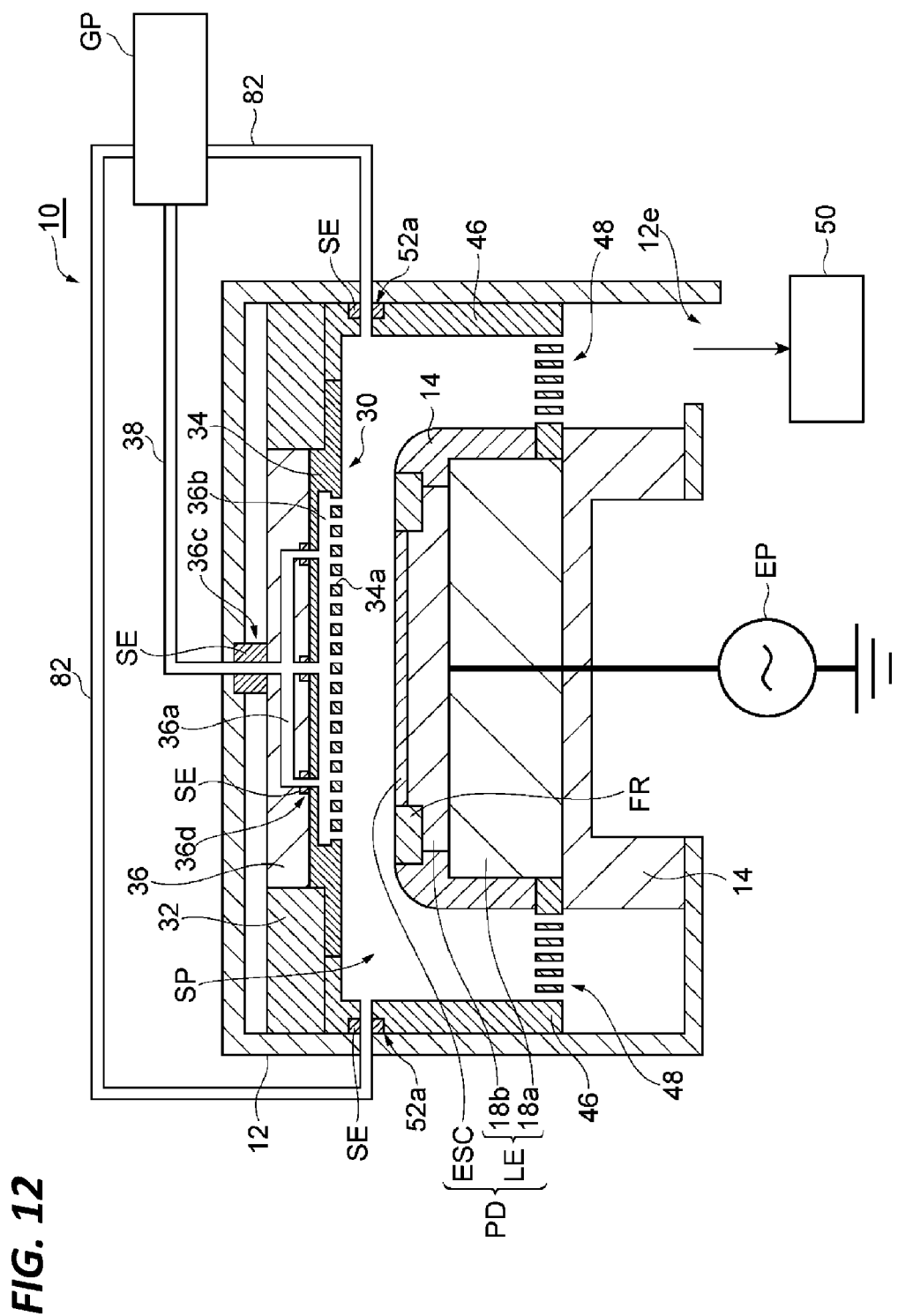
FIG. 12 is a schematic view of a plasma processing apparatus in which a seal structure according to an embodiment is used.

The seal structure SE according to each of the first to eighth embodiments may be used in, for example, a gas inlet (a gas inlet 36c, a gas inlet 36d, or a gas inlet 52a) in a gas flow path of a plasma processing apparatus 10 illustrated in FIG. 12. Referring to FIG. 12, the configuration of the plasma processing apparatus 10 will be described schematically. FIG. 12 is a schematic view illustrating a plasma processing apparatus 10 in which a seal structure SE according to an embodiment is used. The plasma processing apparatus 10 illustrated in FIG. 12 is a capacitively coupled plasma (CCP) type plasma processing apparatus, and is an apparatus used for, for example, plasma etching as a plasma processing. The seal structure SE according to each of the first to eighth embodiments may be applicable to any types of plasma processing apparatus such as, for example, an inductively coupled plasma (ICP) type plasma processing apparatus, an electron cyclotron resonance (ECR) type plasma processing apparatus, and a plasma processing apparatus using microwaves, without being limited to the CCP type plasma processing apparatus illustrated in FIG. 12.

For example, the plasma processing apparatus 10 includes, for example, a processing container 12, an exhaust port 12e, a support unit 14, a first plate 18a, a second plate 18b, an upper electrode 30, an insulative shielding member 32, an upper plate 34, a gas ejection holes 34a, a support 36, a gas diffusion chamber 36a, a gas flow hole 36b, a gas inlet

36c, a gas inlet 36d, a gas supply pipe 38, a deposit shield 46, an exhaust plate 48, an exhaust device 50, a gas inlet 52a, a gas supply pipe 82, an electrostatic chuck ESC, a focus ring FR, a gas supply device GP, a lower electrode LE, and a pedestal PD.

The processing container 12 has a substantially cylindrical shape. The processing container 12 is made of, for example, aluminum, and the inner wall surface of the processing container 12 is anodized. The processing container 12 is securely grounded. A substrate loading/unloading port is provided in the side wall of the processing container 12, and this loading/unloading port is configured to be opened and closed by a gate valve.

On the bottom portion of the processing container 12, a substantially cylindrical support unit 14 is provided. The support unit 14 is made of a metal material such as, for example, aluminum. The support unit 14 extends in the vertical direction (in the direction from the bottom portion 14 toward the upper electrode 30) from the bottom portion of the processing container 12 in the processing container 12. The pedestal PD is provided in the processing container 12. The pedestal PD is supported by the support unit 14.

The pedestal PD holds a wafer W on the upper surface thereof. The pedestal PD includes a lower electrode LE and an electrostatic chuck ESC. The lower electrode LE includes a first plate 18a and a second plate 18b. The first plate 18a has, for example, an insulating material, and has, for example, a substantially disk shape. The second plate 18b has, for example, a metal material, and has, for example, a substantially disk shape. The second plate 18b is electrically connected to a power supply device EP.

On the second plate 18b, an electrostatic chuck ESC is provided. The electrostatic chuck ESC has a structure in which an electrode which is a conductive film is disposed between a pair of insulating layers or insulating sheets. A DC power supply is electrically connected to the electrode of the electrostatic chuck ESC via a switch. The electrostatic chuck ESC attracts a wafer by an electrostatic force such as, for example, a Coulomb force generated by a DC voltage from a DC power supply. As a result, the electrostatic chuck ESC is capable of holding a wafer.

On the peripheral edge portion of the second plate 18b, a focus ring FR is disposed to surround the edge of the wafer and the electrostatic chuck ESC. The focus ring FR is provided in order to improve the uniformity of plasma processing. The focus ring FR may have a material such as, for example, silicon, quartz, or SiC.

The upper electrode 30 is a ceiling member that constitutes the ceiling of the processing container 12. The upper electrode 30 is disposed above the pedestal PD so as to face the pedestal PD. The lower electrode LE and the upper electrode 30 are provided substantially parallel to each other. Between the upper electrode 30 and the pedestal PD, a processing space Sp is provided to perform a plasma processing on the wafer.

The upper electrode 30 is supported in the upper portion of the processing container 12 via an insulative shielding member 32. In an embodiment, the upper electrode 30 may be configured such that the distance from the upper surface of the pedestal PD (i.e., the wafer placement surface) in the vertical direction is variable. The upper electrode 30 includes an upper plate 34 and a support 36.

The top plate 34 faces the processing space Sp, and a plurality of gas ejection holes 34a are provided in the upper plate 34. The upper plate 34 may have a material such as, for example, silicon, quartz, or SiC. The upper plate 34 may also be formed by applying a ceramic coating to an electrically conductive (e.g., aluminum) base material. Inside the upper plate 34, a plurality of gas flow holes 36b are provided. The plurality of gas flow holes 36b are connected to the plurality of gas ejection holes 34a, respectively.

The support 36 detachably supports the upper plate 34, and may include a conductive material such as, for example, aluminum. The support 36 may have a water-cooled structure. A gas diffusion space 36a is provided inside the support 36.

The gas diffusion chamber 36a is connected to the gas supply pipe 38 via a gas inlet 36c. The gas diffusion chamber 36a is connected to each of the plurality of gas flow holes 36b via each of a plurality of gas inlets 36d.

The deposit shield 46 is detachably installed on the inner wall of the processing container 12 along the inner wall of the processing container 12. The deposit shield 46 prevents an etching byproduct (deposit) from adhering to the processing container 12, and may be configured by coating an aluminum material with ceramics such as $Y_2O_3$.

On the bottom side of the processing container 12, an exhaust plate 48 is provided between the support unit 14 and the side wall of the processing container 12. The exhaust plate 48 may be configured by coating, for example, an aluminum material with ceramics such as, for example, $Y_2O_3$. A large number of through holes are formed in the exhaust plate 48. An exhaust port 12e is provided below the exhaust plate 48 (toward the outside of the processing container 12). An exhaust device 50 is connected to the exhaust port 12e. The exhaust device 50 may be a vacuum pump such as, for example, a turbo molecular pump.

The power supply device EP includes a first radio-frequency power supply configured to generate radio-frequency waves (having a frequency in the range of about 27 MHz to 100 MHz and in an example, having a frequency of about 40 MHz) for plasma generation, a second radio-frequency power supply configured to generate radio-frequency waves (having a frequency in the range of about 400 kHz to 13.56 MHz, and in one example, having a frequency of about 3.2 MHz), a first matching device connected to the first radio-frequency power supply, and a second matching device connected to the second radio-frequency power supply.

The first radio-frequency power supply is connected to the lower electrode LE via the first matching device. The first matching device has a circuit for matching the output impedance of the first radio-frequency power supply with the input impedance on the load side (the lower electrode LE side). The second radio-frequency power supply is connected to the lower electrode LE via the second matching device. The second matching device has a circuit for matching the output impedance of the second radio-frequency power supply with the input impedance on the load side (the lower electrode LE side).

One or more gas supply pipes may be used to supply a gas in the plasma processing apparatus 10. In an embodiment, the plasma processing apparatus 10 includes at least two gas supply pipes (a gas supply pipe 38 and a gas supply pipe 82). A gas supply apparatus GP includes a gas source group, a valve group, and a flow rate controller group. The gas supply apparatus GP is connected to the gas supply pipe 38 and the gas supply pipe 82. The gas source group of the gas supply apparatus GP has a plurality of gas sources. The valve group of the gas supply apparatus GP has a plurality of valves. The flow rate controller group of the gas supply apparatus GP has a plurality of flow rate controllers such as, for example, mass flow controllers.

Each of the plurality of gas sources of the gas source group of the gas supply apparatus GP is connected to the gas supply pipe 38 and the gas supply pipe 82 via the corresponding value of the valve groups of the gas supply apparatus GP and the corresponding flow rate controller of the controller group of the gas supply apparatus GP. Accordingly, the plasma processing apparatus 10 is capable of supplying the gases from one or more gas sources selected among the plurality of gas sources of the gas source group of the gas supply apparatus GP into the processing container 12, at individually adjusted flow rates.

In the seal structure SE and the seal method MT according to each of the first to eighth embodiments described above, since a cap unit BC is in close contact via an elastic unit BL, the movement of components toward or away from each other (the relative movement in the direction DA along the gas flow path GL of each flow path component) is absorbed by expansion and contraction of the elastic unit BL, and the sealing of the gas flow path GL is maintained. In addition, flow path components (which are the flow path component BM1 and the flow path component BM2 and further include the flow path component BM3 in the case of the eighth embodiment), an elastic units BL, and a cap unit BC, which define the gas flow path GL, always maintain the close contact state by the restoring force of the elastic unit BL, and the cap unit BC is fitted into the grooves BM1a in the surface SF1 of the flow path component BM1 while covering the elastic unit BL. Thus, friction and shear (stress in the direction DB) due to sliding movement between the components (relative movement of each flow path component in the direction DB along the boundary CN) occurs in the cap unit BC. That is, since the cap unit BC covers the elastic unit BL provided in the flow path component BM1 with respect to the flow path component BM2, the elastic unit BL does not come into direct contact with a flow path component facing the flow path component BM1 (which is the flow path component BM2 and further includes the flow path component BM3 in the eighth embodiment), and thus the above-mentioned movement does not affect the elastic unit BL even when the flow path components slide relative to each other. In addition, since the cap unit BC is in close contact via the elastic unit BL, the movement of the flow path components toward and away from each other is absorbed by expansion and contraction of the elastic unit BL, the sealing of the gas flow path GL is maintained. That is, the flow path component BM1 and the elastic unit BL, the elastic unit BL and the cap unit BC, and the cap unit BC and the flow path component BM2 (further, the cap unit BC and the flow path component BM3 in the eighth embodiment) always maintain a close contact state by the restoring force of the elastic unit BL. Therefore, with the seal structure SE, it is possible to reduce, for example, breakage and deterioration of the elastic body portion BL due to the sliding movement of the flow path components while obtaining followability between the flow path components by the elastic unit BL with respect to the movement of the flow path components toward and away from each other. In the cap unit BC, a polytetrafluoroethylene material, which is excellent in slidability, may be used.

In addition, since the seal member SZ including the flow path component BM1, the elastic unit BL, and the cap unit BC is slidingly movable with respect to the flow path component BM2, it is possible to smoothly perform connection between the through hole TH1 of the flow path component BM1 and the through hole TH2 of the flow path component BM2 and release of this connection by moving the seal member SZ along the surface SF2 of the flow path component BM2.

As described above, there is provided a technique for sufficiently suppressing gas leakage without causing abnormality such as, for example, breakage in a gas flow path that crosses a boundary where, for example, sliding movement and approach of components occur.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A seal structure for sealing a gas flow path, the seal structure comprising:
   a first component and a second component that define a flow path; and
   an elastic body and a cap installed in a boundary between the first component and the second component,
   wherein the first component includes a first through hole and a first surface, and the second component includes a second through hole and a second surface,
   the first through hole extends from the first surface, and the second through hole extends from the second surface,
   the boundary is defined by the first surface and the second surface, and the flow path is defined by connecting the first through hole and the second through hole to each other,
   the first component and the second component are arranged such that the first through hole and the second through hole are connected to each other,
   the elastic body has a loop shape and is installed in a groove in the first surface so as to protrude from the first surface, the elastic body being arranged such that a first opening of the first through hole overlaps with a second opening of the loop shape of the elastic body when viewed from above the first surface,
   the cap includes a third opening and is disposed on the elastic body to cover the elastic body such that the third opening, the second opening, and the first opening overlap with each other when viewed from above the first surface, the cap being fitted into the groove in the first surface and being in close contact with the second surface, and
   the cap and second component are in close contact with each other to have slidability, and the elastic body is not in contact with the second component.

2. The seal structure of claim 1, wherein the cap includes a polytetrafluoroethylene material.

3. The seal structure of claim 1, wherein a seal member including the first component, the elastic body, and the cap is configured to slidingly move along the second surface with respect to the second component, and
   the movement of the seal member along the second surface with respect to the second component switches between the connection between the first through hole and the second through hole and the release of the connection.

4. A seal structure for sealing a gas flow path, the seal structure comprising:
   a first component and a second component that define a flow path; and an elastic body and a cap installed in a boundary between the first component and the second component, wherein the first component includes a first through hole and a first surface, and the second component includes a second through hole and a second surface, the first through hole extends from the first surface, and the second through hole extends from the second surface, the boundary is defined by the first surface and the second surface, and the flow path is defined by connecting the first through hole and the second through hole to each other, the first component and the second component are arranged such that the first through hole and the second through hole are connected to each other, the elastic body has a loop shape and is installed in a groove in the first surface so as to protrude from the first surface, the elastic body being arranged such that a first opening of the first through hole overlaps with a second opening of the loop shape of the elastic body when viewed from above the first surface, the cap includes a third opening and is disposed on the elastic body to cover the elastic body such that the third opening, the second opening, and the first opening overlap with each other when viewed from above the first surface, the cap being fitted into the groove in the first surface and being in close contact with the second surface, and the cap and second component are in close contact with each other to have slidability, another second component is further provided, and the first component is removably arranged between the second component and the another component arranged to face each other.

5. The seal structure of claim 2, wherein a seal member including the first component, the elastic body, and the cap is configured to slidingly move along the second surface with respect to the second component, and the movement of the seal member along the second surface with respect to the second component switches between the connection between the first through hole and the second through hole and the release of the connection.

6. The seal structure of claim 1, wherein another second component is further provided, and the first component is removably arranged between the second component and the another second component arranged to face each other.

7. A method for sealing a gas flow path, the method comprising:

providing a first component having a first through hole and a second component having a second through hole;

installing an elastic body having a loop shape in a groove in a first surface of the first component so as to protrude from the first surface, and arranging the elastic body such that a first opening of the first through hole overlaps with a second opening of the loop shape of the elastic body when viewed from above the first surface and the elastic body is not in contact with the second component;

installing a cap having a third opening on the elastic body while covering the elastic body such that the first opening, the second opening, and the third opening overlap with each other when viewed from above the first surface, and fitting the cap into the groove in the first surface; and defining the flow path by assembling the first component and the second component via the elastic body and the cap such that the first through hole and the second through hole are connected to each other and bringing the cap into close contact with a second surface of the second component.

8. The seal structure of claim 1, wherein an entire portion of the elastic body is not in contact with the second component.

9. The seal structure of claim 1, wherein the cap covers the elastic body provided in the first component with respect to the second component.

10. The seal structure of claim 1, wherein the elastic body is in selectively contact with the first component among the first and second components.

11. The seal structure of claim 1, wherein at least a portion of the cap is disposed between the elastic body and the second component such that the elastic body is not in contact with the second component.

* * * * *